US009722969B2

(12) United States Patent
Jheng et al.

(10) Patent No.: US 9,722,969 B2
(45) Date of Patent: Aug. 1, 2017

(54) MAINTENANCE METHOD FOR NETWORK CONNECTION AND COMPUTER SYSTEM

(71) Applicant: Acer Incorporated, New Taipei (TW)

(72) Inventors: Siang-Sheng Jheng, New Taipei (TW); Ching-Ho Tsai, New Taipei (TW); Shu-Chun Liao, New Taipei (TW); Chao-Shih Huang, New Taipei (TW); Yu-Ren Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 272 days.

(21) Appl. No.: 14/592,920

(22) Filed: Jan. 9, 2015

(65) Prior Publication Data

US 2016/0156542 A1 Jun. 2, 2016

(30) Foreign Application Priority Data

Nov. 28, 2014 (TW) .............................. 103141434 A

(51) Int. Cl.
*H04L 29/12* (2006.01)
*H04L 12/26* (2006.01)
*H04L 12/12* (2006.01)

(52) U.S. Cl.
CPC .......... *H04L 61/2007* (2013.01); *H04L 12/12* (2013.01); *H04L 43/0811* (2013.01); *Y02B 60/34* (2013.01)

(58) Field of Classification Search
CPC .................................................. H04L 61/2007

USPC .......................................................... 709/224
See application file for complete search history.

(56) References Cited

U.S. PATENT DOCUMENTS

| 8,611,268 | B1 | 12/2013 | Thandaveswaran | |
|---|---|---|---|---|
| 2005/0220061 | A1* | 10/2005 | Wawra | H04L 29/06 370/338 |
| 2006/0090023 | A1 | 4/2006 | Olsen et al. | |
| 2009/0210519 | A1* | 8/2009 | Zill | H04L 12/12 709/220 |
| 2010/0042674 | A1 | 2/2010 | Pantalone et al. | |
| 2010/0223484 | A1* | 9/2010 | Bold | G06F 1/206 713/324 |

* cited by examiner

*Primary Examiner* — Andrew Georgandellis
(74) *Attorney, Agent, or Firm* — Jianq Chyun IP Office

(57) ABSTRACT

A maintenance method for network connection and a computer system are provided. The method is adapted to a computer system having a timer. The timer is configured to regularly wake up the computer system to check whether a network connection is working normally. In the method, the computer system is waked up at intervals of a first time interval within a predetermined period and a current IP address of the computer system is extracted. The predetermined period is divided into a plurality of periods by the first time interval. Whether a change occurs on the IP address is determined within each of the periods, and accordingly the computer system is waked up to check the network connection.

10 Claims, 4 Drawing Sheets

MAINTENANCE METHOD FOR NETWORK CONNECTION AND COMPUTER SYSTEM

CROSS-REFERENCE TO RELATED APPLICATION

This application claims the priority benefit of Taiwan application serial no. 103141434, filed on Nov. 28, 2014. The entirety of the above-mentioned patent application is hereby incorporated by reference herein and made a part of this specification.

BACKGROUND OF THE INVENTION

Field of the Invention

The invention relates to a maintenance method for network connection, and more particularly, relates to a method and a computer system capable of maintaining network connection by regularly waking up the system.

Description of Related Art

In recent years, with rapid advancement of computer technology, remote control technologies have been widely adopted. Users may operate a computer system remotely over a network at any time and anywhere. For example, a general user may control the computer system at home or office from anywhere by using the remote control technology, so as to obtain desired data or perform a remote task. By utilizing the remote control technology, system management personnel may further obtain messages such as a hardware status of the computer system, a system event log record and the like, so as to handle current status of the computer system at all time without restriction of time and space.

In the existing remote control technologies, when a user end intends to remotely connect to the computer system that entered a power-saving mode (e.g., S3/S4 mode as specified by the Advanced Configuration and Power Interface (ACPI)), the Internet Protocol (IP) address of the computer system must be obtained first before the user end can wake up the computer system by using the Wake on LAN (WOL) technology such that demands of the user end for the remote control can be satisfied. Most of these demands may come from the computer system at home, in which the IP address is a floating IP address provided by the Internet Service Provider (ISP). In practice, the ISP periodically changes the floating IP address in order to prevent network attack events from Internet hackers.

However, if a change on the IP address of the computer system occurs while the computer system is in the power-saving mode, the computer system may not be able to transmit a new IP address obtained after the change to the user end that intends to use the remote control. Accordingly, functions of the remote control may no longer be used since the user end cannot successfully transmit a wake packet to the computer system via the new IP address.

SUMMARY OF THE INVENTION

Accordingly, the invention provides a maintenance method for network connection and a computer system, which are capable of detecting a period where a change occurs on the IP address of the computer system and waking up the computer system at the period where the change occurs on the IP address by a timer, so as maintain a normal operation of the network connection.

The maintenance method for network connection of the invention is adapted for a computer system having a timer. The timer is configured to regularly wake up the computer system to check whether a network connection is working normally. In the method, the computer system is waked up at intervals of a first time interval within a predetermined period and a current IP address of the computer system is extracted. The predetermined period is divided into a plurality of periods by the first time interval. Whether a change occurs on the IP address within each of the periods is determined, and accordingly the computer system is waked up to check the network connection.

The computer system of the invention includes a network card, a timer and a processor. The network card establishes a network connection. The timer wakes up the computer system that entered the power-saving mode at intervals of a first time interval within a predetermined period. The predetermined period is divided into a plurality of periods by the first time interval. The processor extracts an IP address of the computer system, and determines whether a change occurs on the IP address within each of the periods and accordingly sets the timer to wake up the computer system to check the network connection.

Based on the above, the maintenance method for network connection and the computer system of the invention are capable of detecting the period where the change occurs on the IP address of the computer system within the predetermined period. Further, a timer may be set to wake up the computer system in the power-saving mode according to the detected period, so that the computer system may respond to the changes on the IP address in the normal mode to maintain the normal operation of the network connection. As a result, the network connection may be maintained by preventing the situation in which the user terminal can no longer perform the remote control on the computer system once the change occurs on the IP address of the computer system.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
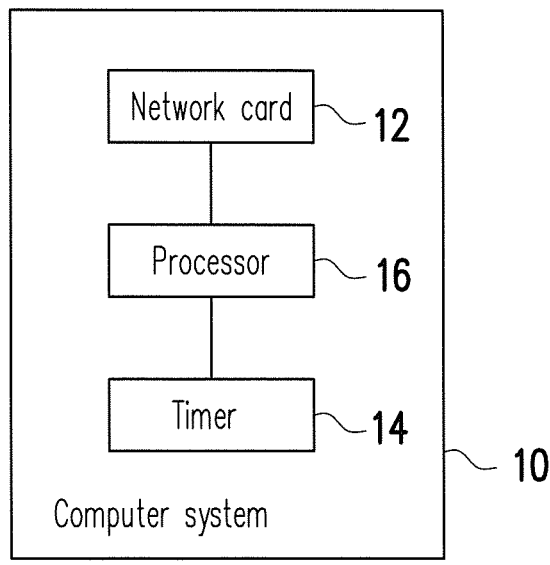
FIG. 1 is a block diagram illustrating a computer system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In general, a computer system may enter a power-saving mode while not in use, so as to prevent unnecessary power consumption. Accordingly, the invention is capable of regularly waking up the computer system at intervals of a predetermined time interval by using a real-time counter (RTC), so as to effectively maintain the network connection of the computer system in response to changes in the IP address of the computer system. As such, users can successfully gain access to the data and the status of the computer system to effectively operate with remote control technology.

FIG. 1 is a block diagram illustrating a computer system according to an embodiment of the invention. Referring to FIG. 1, a computer system 10 of the present embodiment is, for example, a computer device (e.g., a desktop computer, a notebook computer or a server), which includes a network card 12, a timer 14 and a processor 16, and their functions are respectively described as follows.

The network card 12 is, for example, a wireless network card in compliance with a wireless communication standard (e.g., institute of electrical and electronics engineers (IEEE) 802.11n/b/g), or a network card in compliance with a wired network connection. The network card may establish a network connection with other devices over an external network in a wired or wireless manner.

The timer 14 may be a real-time counter or any element having a timing function. When the computer system 10 enters a power-saving mode (S3/S4 mode as specified by the Advanced Configuration and Power Interface (ACPI)), the timer 14 may regularly wake up the computer system 10 to check whether the network connection of the computer system 10 is working normally.

The processor 16 is, for example, a central processing unit (CPU) of single-core or multi-core, or other programmable devices for general purpose or special purpose, such as a microprocessor, a digital signal processor (DSP), a programmable controller, an application specific integrated circuit (ASIC), a programmable logic device (PLD) or other similar devices or a combination of above-mentioned devices. The processor 16 is coupled to the network card 12 and the timer 14 to realize functions for maintaining the network connection. Detailed steps for maintaining the network connection by the computer system 10 are as described in the following embodiments.

Figure 2:
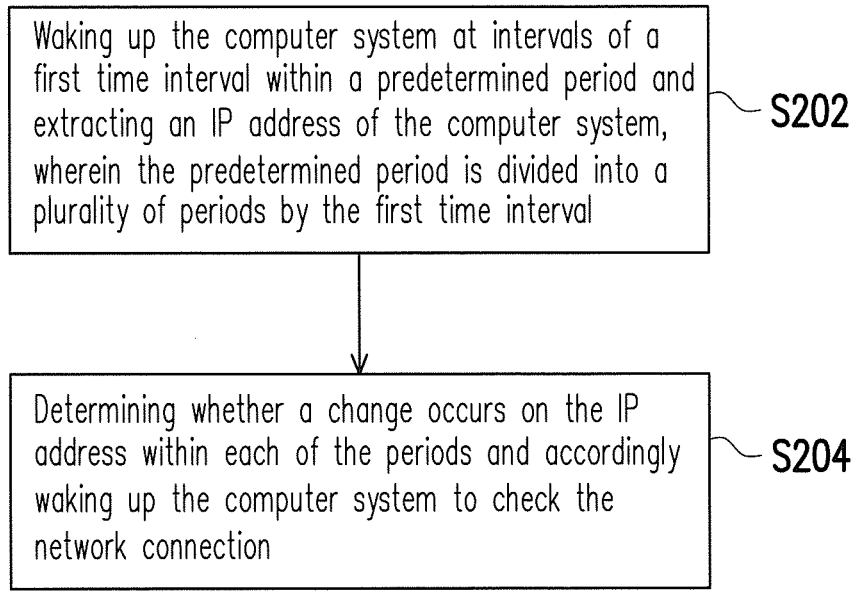
FIG. 2 is a flowchart illustrating a maintenance method for network connection according to an embodiment of the invention.

FIG. 2 is a flowchart illustrating a maintenance method for network connection according to an embodiment of the invention. Referring to FIG. 1 and FIG. 2 together, the maintenance method for network connection of the present embodiment is adapted to the computer system 10 of FIG. 1. The following steps are elaborated to describe the maintenance method for network connection of the invention by reference with each element in the computer system 10.

In step S202, the timer 14 may wake up the computer system 10 at intervals of a first time interval within a predetermined period, and the processor 16 may extract an IP address of the computer system 10. The predetermined period may be divided into a plurality of periods by the first time interval. Specifically, when the computer system 10 enters the power-saving mode (e.g., S3/S4 mode), the timer 14 may regularly wake up the computer system 10 at intervals of the first time interval within the predetermined period. For instance, if the predetermined period is set to be 7 days (i.e., 168 hours) and the first time interval is set to be 30 minutes, each day of the predetermined period (7 days) may be divided into a plurality of periods by 30 minutes, such as 12:00 to 12:30, 12:30 to 13:00, 13:00 to 13:30, and so on. Further, each time when the computer system 10 is waked up, the processor 16 may extract the IP address of the computer system 10 through an operating system (e.g., Microsoft Windows) executed by the computer system 10 or functions of the network card 12. It should be noted that, based on actual requirements, person skilled in the art may freely set up a time length for the predetermined period and the first time interval, which are not particularly limited by the present embodiment of the invention.

In step S204, the processor 16 may determine whether a change occurs on the IP address within each of the periods (e.g., 12:00 to 12:30, 12:30 to 13:00, 13:00 to 13:30, etc.), and accordingly wake up the computer system 10 to check the network connection. Specifically, after the period where the change occurs on the IP address of the computer system 10 is determined, the processor 16 may set the timer 14 to wake up the computer system 10 at the period where the change occurs on the IP address (e.g., 12:00 to 12:30), so as to prevent the network connection from interruption caused by the changes in the IP address of the computer system 10 which cannot be detected.

In another embodiment, the computer system may count a number of times that the change occurs on the IP address within each of the periods, and sets the timer to regularly wake up the computer system at the period where the change occurs on the IP address, so as to maintain the network connection.

Figure 3:
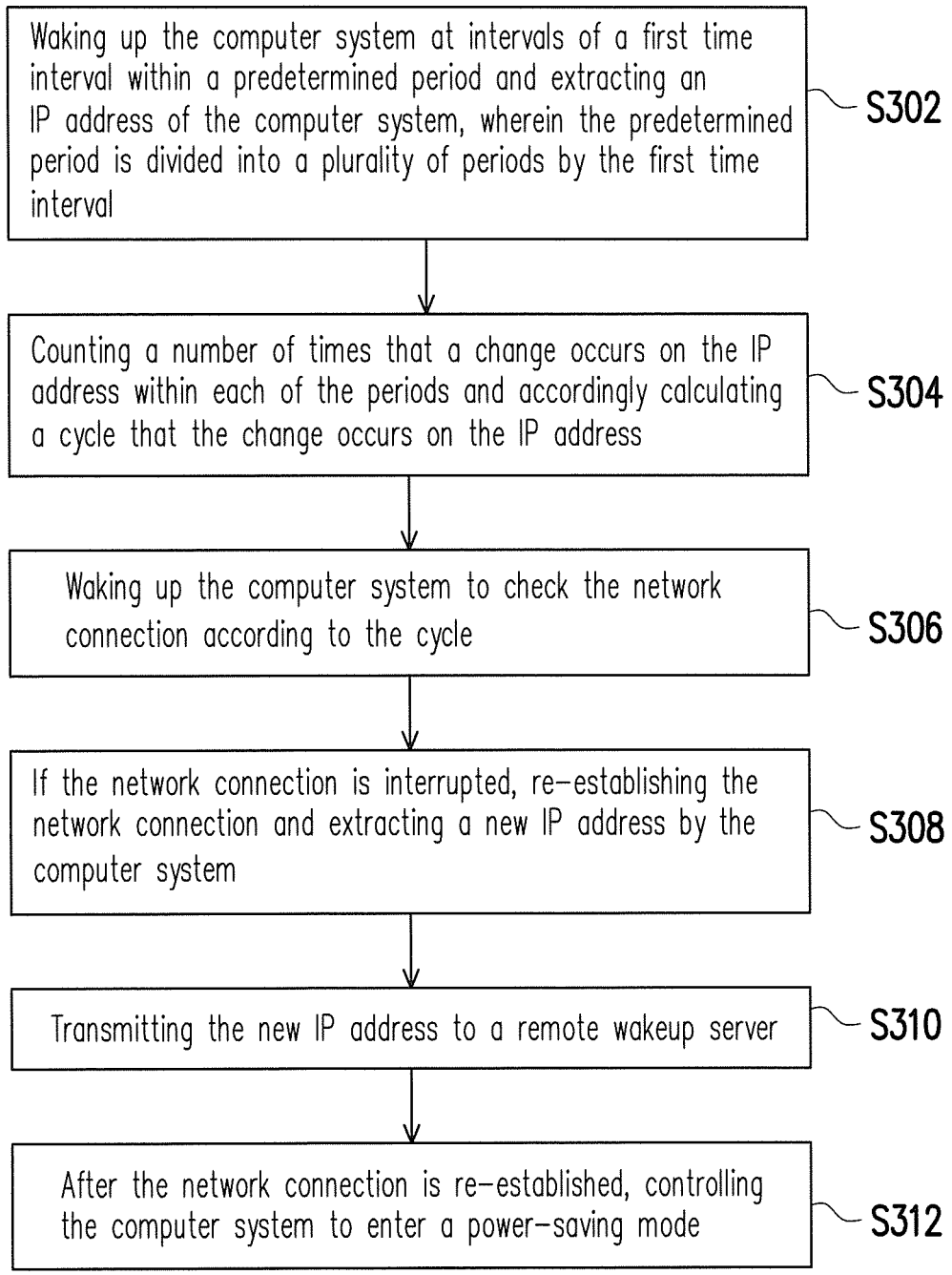
FIG. 3 is a flowchart illustrating a maintenance method for network connection according to an embodiment of the invention.

Specifically, FIG. 3 is a flowchart illustrating a maintenance method for network connection according to an embodiment of the invention. Referring to FIG. 1 and FIG. 3 together, the maintenance method for network connection of the present embodiment is adapted for the computer system 10 of FIG. 1. The following steps are elaborated to describe the maintenance method for network connection of the invention by reference with each element in the computer system 10.

In step S302, the timer 14 may wake up the computer system 10 at intervals of a first time interval, and the processor 16 may extract an IP address of the computer system 10. The predetermined period may be divided into a plurality of periods by the first time interval. Said step S302 is identical or similar to step S202 in the foregoing embodiment, thus detailed content thereof is not repeated hereinafter.

Unlike the foregoing embodiment, in the present embodiment, the processor 16 may count a number of times that the change occurs on the IP address within each of the periods, and accordingly calculate a cycle that the change occurs on the IP address in step S304. For instance, the processor 16 may establish a table. The table includes the periods divided by the first time interval (e.g., 30 minutes), such as 12:00 to 12:30, 12:30 to 13:00, 13:00 to 13:30 and so on. In addition, in this table, each of the periods includes, for example, the corresponding number of times that the change occurs on the IP address and a date. When the table is just established, the number of times that the change occurs on the IP address corresponding to each of the periods in each date is set to be 0. However, within the predetermined period, each time when the computer system 10 detects that the change occurs on the IP address within one specific period (e.g., 12:00 to 12:30), the processor 16 updates the number of times that the change occurs on the IP address corresponding to the specific period in the table (adding one to the number of times). Further, after the predetermined period (e.g., 7 days), the processor 16 counts the number of times that the change occurs on the IP address for each of the periods in each day in the table (e.g., the number of times that the change occurs on the IP address within the period of 12:00 to 12:30 within 7 days is 10, the number of times that the change occurs on the IP address within the period of 4:00 to 4:30 within 7 days is 0, and so on), so as to calculate the cycle that the change occurs on the IP address (e.g., the change occurs on the IP address once within the period of 12:00 to 12:30 everyday).

Next, in step S306, the processor 16 may set the timer 14 to wake up the computer system 10 to check the network connection according to such cycle. Specifically, the processor 16 may set the timer 14 to wake up the computer system 10 to check the network connection according to the cycle calculated based on aforesaid table.

Next, in step S308, if the network connection is interrupted, the processor 16 controls the network card 12 of the computer system 10 to re-establish the network connection and extract a new IP address. Specifically, when the network connection is checked according to the calculated cycle, if it is detected that the network connection is interrupted, the processor 16 may control the network card 12 of the computer system 10 to re-establish the network connection and extract the new IP address.

Next, in step S310, the processor 16 may transmit the new IP address to a remote wakeup server (user terminal) by using the network card 12, so that the remote wakeup server may utilize the new IP address to wake up and control the computer system 10.

Lastly, in step S312, after the network connection is re-established, the processor 16 may control the computer system 10 to enter the power-saving mode. Specifically, after the processor 16 re-establishes the network connection by using the network card 12, the processor 16 may control the computer system 10 to enter the power-saving mode in order to save power consumption.

In another embodiment, within the period where the change occurs on the IP address, the computer system may use a smaller time interval to accurately determine an exact time when the change occurs on the IP address, so as to reduce unnecessary wakeup time to further save the power consumption.

Figure 4:
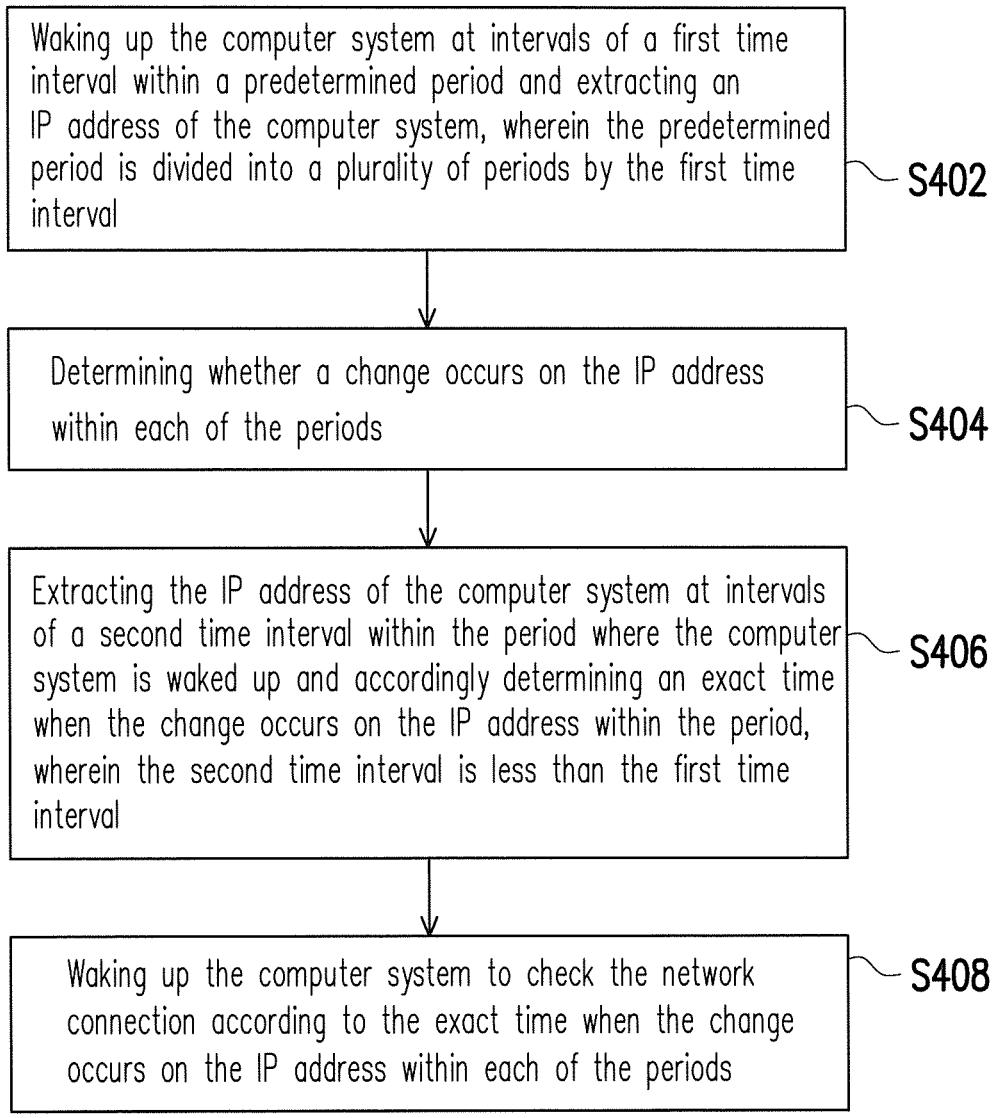
FIG. 4 is a flowchart illustrating a maintenance method for network connection according to an embodiment of the invention.

Specifically, FIG. 4 is a flowchart illustrating a maintenance method for network connection according to an embodiment of the invention. Referring to FIG. 1 and FIG. 4 together, the maintenance method for network connection of the present embodiment is adapted for the computer system 10 of FIG. 1. The following steps are elaborated to describe the maintenance method for network connection of the invention by reference with each element in the computer system 10.

In step S402, the timer 14 may wake up the computer system 10 at intervals of a first time interval, and the processor 16 may extract an IP address of the computer system 10. The predetermined period may be divided into a plurality of periods by the first time interval. Said step S402 is identical or similar to step S302 in the foregoing embodiment, thus detailed content thereof is not repeated hereinafter.

Next, in step S404, the processor 16 may determine whether a change occurs on the IP address within each of the periods. Unlike the foregoing embodiment, in the present embodiment, within the period where the computer system 10 is waked up, the processor 16 may extract the IP address of the computer system 10 at intervals of a second time interval and accordingly determine an exact time when the change occurs on the IP address within the period in step S406. The second time interval is less than the first time interval. For instance, when the processor 16 determines that the period (e.g., 12:00 to 12:30) where the change occurs on the IP address of the computer system 10, the processor 16 may extract the IP address of the computer system 10 at intervals of the second time interval (e.g., 1 minute) which is less than the first time interval within such period (i.e., the IP address of the computer system 10 is extracted at 12:01, 12:02 to 12:29, 12:30, respectively). Accordingly, the processor 16 may detect the IP address by using the smaller second time interval (e.g., 1 minute), so as to determine the exact time when the change occurs on the IP address within the period more accurately (e.g., it may be determined that the exact time is 12:09, 12:11, etc.).

Lastly, in step S408, the processor 16 may accordingly set the timer 14 to wake up the computer system 10 to check the network connection. Specifically, the processor 16 may set the timer 14 to regularly wake up the computer system 10 according to the determined exact time when the change occurs on the IP address, so as to check the network connection by using a shorter wakeup time to further save power consumption.

In another embodiment, the computer system may record the period where the change occurs on the IP address as a corresponding history record, such that the computer system may locate the corresponding history record later by using an identification code, and accordingly set the timer to regularly wake up the computer system.

Figure 5:
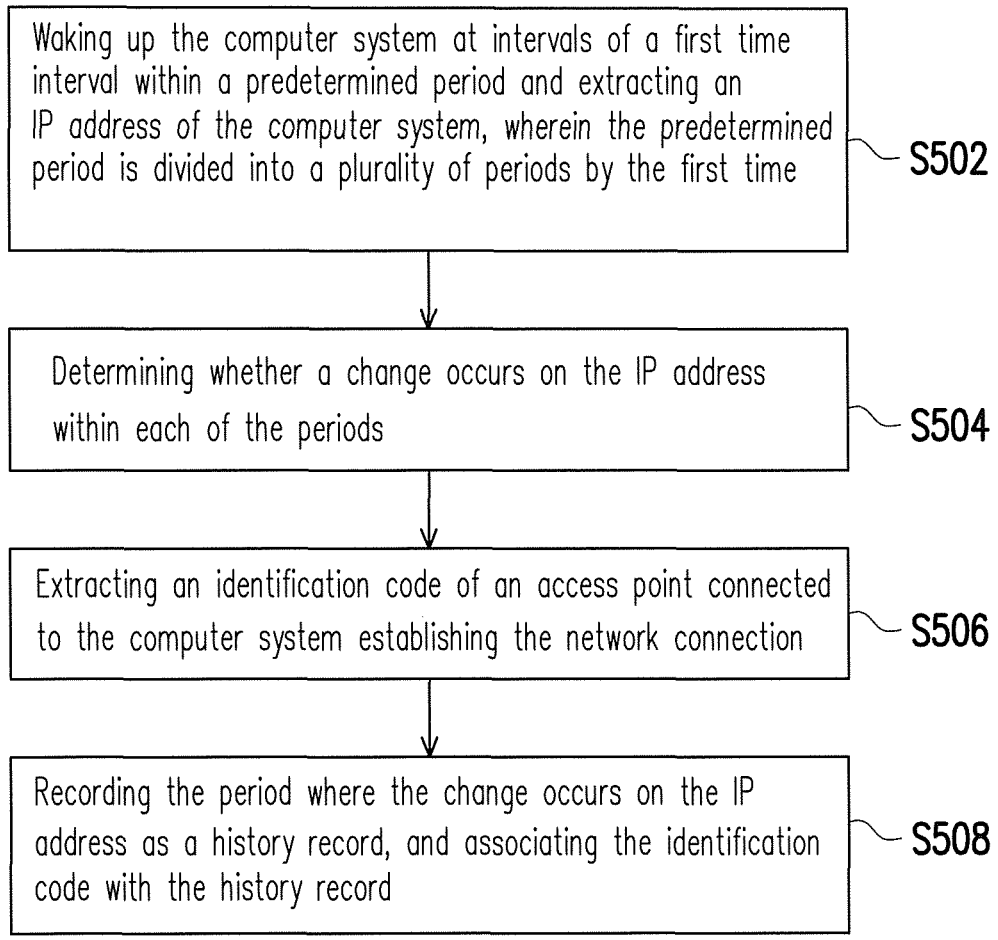
FIG. 5 is a flowchart illustrating a maintenance method for network connection according to an embodiment of the invention.

Specifically, FIG. 5 is a flowchart illustrating a maintenance method for network connection according to an embodiment of the invention. Referring to FIG. 1 and FIG. 5 together, the maintenance method for network connection of the present embodiment is adapted for the computer system 10 of FIG. 1. The following steps are elaborated to describe the maintenance method for network connection of the invention by reference with each element in the computer system 10.

In step S502, the timer 14 may wake up the computer system 10 at intervals of a first time interval, and the processor 106 may extract an IP address of the computer system 10. The predetermined period may be divided into a plurality of periods by the first time interval. Next, in step S504, the processor 16 may determine whether a change occurs on the IP address within each of the periods. Said steps S502 and S504 are identical or similar to steps S402 and S404 in the foregoing embodiment respectively, thus detailed content thereof is not repeated hereinafter.

Unlike the foregoing embodiment, in the present embodiment, the processor 16 may extract an identification code of an access point connected to the computer system 10 establishing the network connection in step S506. For instance, the network connection established by the computer system 10 is connected to the Internet by a connection of the access point (e.g., the connection of a router or a wireless base station) in the network environment. In the present embodiment, the processor 16 may extract the identification code (e.g., Service Set Identifier (SSID)) of said access point connected to the computer system 10 through the network card 12, and identify the access point according to the identification code.

Lastly, in step S508, the processor 16 may record the period where the change occurs on the IP address as a history record into a storage unit (not illustrated) of the computer system 10, and associate the identification code with the history record. Specifically, the processor 16 may record one history record into the storage unit (not illustrated). Herein, the history record at least records each of the periods where the change occurs on the IP address of the computer system 10 and the associated identification codes thereof to serve as a reference for setting the wakeup time next time.

For instance, in another embodiment, after the identification code of the access point is extracted by the processor 16, the processor 16 may compare the extracted identification code with a plurality of the identification codes associated with a plurality of the history records stored in the storage unit (not illustrated) in order to locate the history record associated with the extracted identification code (i.e. a current access point). Further the processor 16 may set the timer 14 to wake up the computer system 10 to check the network connection according to the period or the cycle where the change occurs on the IP address, which is recorded in the history record.

In summary, the maintenance method for network connection and the computer system of the invention are capable of detecting the period where the change occurs on the IP address of the computer system, and accordingly setting the timer to regularly wake up the computer system in the power-saving mode within the period where the change occurs on the IP address. Accordingly, the computer system is capable of maintaining normal operations of the network connection in response to changes in the IP address, so as to prevent the interruption of the network connection.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A maintenance method for network connection, adapted for a computer system having a timer, the timer being configured to regularly wake up the computer system to check whether a network connection is working normally, and the method comprising:
    dividing a predetermined period into a plurality of equal sub-periods by a first time interval;
    during each sub-period of the predetermined period:
        waking up the computer system;
        extracting an IP address of the computer system; and
        determining whether a change occurs on the IP address; and
    after the predetermined period:
        waking up the computer system to check the network connection during only the sub-periods in which a change was determined to have occurred on the IP address;
        re-establishing the network connection and extracting a new IP address by the computer system if the network connection is interrupted; and
        controlling the computer system to enter a power-saving mode after the network connection is re-established.

2. The maintenance method for network connection of claim 1, wherein after the step of extracting the new IP address, the method further comprises:
    transmitting the new IP address to a remote wakeup server.

3. The maintenance method for network connection of claim 1, wherein the step of determining whether the change occurs on the IP address and waking up the computer system to check the network connection during only the sub-periods in which the change was determined to have occurred on the IP address further comprises:
    extracting the IP address of the computer system at intervals of a second time interval within the sub-periods where the computer system is waked up and accordingly determining an exact time when the change occurs on the IP address within the sub-periods, wherein the second time interval is less than the first time interval.

4. The maintenance method for network connection of claim 1, wherein the step of determining whether the change occurs on the IP address and waking up the computer system to check the network connection further comprises:
    extracting an identification code of an access point connected to the computer system establishing the network connection
    recording the sub-periods where the change occurs on the IP address as a history record and associating the identification code with the history record.

5. The maintenance method for network connection of claim 4, wherein after the step of extracting the identification code of the access point connected to the computer system establishing the network connection, the method further comprises:
    comparing the extracted identification code with a plurality of the identification codes associated with a plurality of the history records to locate the history record associated with the extracted identification code; and
    waking up the computer system to check the network connection according to the sub-periods where the change occurs on the IP address, which is recorded in the history record.

6. A computer system, comprising:
    a network card, establishing a network connection;
    a timer, waking up the computer system in a power-saving mode at intervals of a first time interval during each sub-period of a predetermined period, wherein the predetermined period is divided into a plurality of equal sub-periods by the first time interval; and
    a processor, coupled to the network card and the timer, extracting an IP address of the computer system, and determining whether a change occurs on the IP address during each sub-period of the predetermined period; and after the predetermined period, the processor is configured to:
        setting the timer to wake up the computer system to check the network connection during only the sub-periods in which a change was determined to have occurred on the IP address,
        controlling the network card to re-establish the network connection and to extract a new IP address if the network connection is interrupted; and
        controlling the computer system to enter a power-saving mode after the network connection is re-established.

7. The computer system of claim 6, wherein the processor transmits the new IP address to a remote wakeup server by using the network card.

8. The computer system of claim 6, wherein the processor extracts the IP address of the computer system at intervals of a second time interval within the sub-periods where the computer system is waked up and accordingly determines an exact time when the change occurs on the IP address within the sub-periods, wherein the second time interval is less than the first time interval.

9. The computer system of claim 6, further comprising:
a storage unit, wherein the processor extracts an identification code of an access point connected to the computer system establishing the network connection, and records the sub-periods where the change occurs the IP address as a history record into the storage unit and associates the identification code with the history record.

10. The computer system of claim 9, wherein the processor compares the extracted identification code with a plurality of the identification codes associated with a plurality of the history records stored in the storage unit to locate the history record associated with the extracted identification code, and sets the timer to wake up the computer system to check the network connection according to the sub-periods where the change occurs on the IP address, which is recorded in the history record.

* * * * *